Patented Feb. 9, 1932

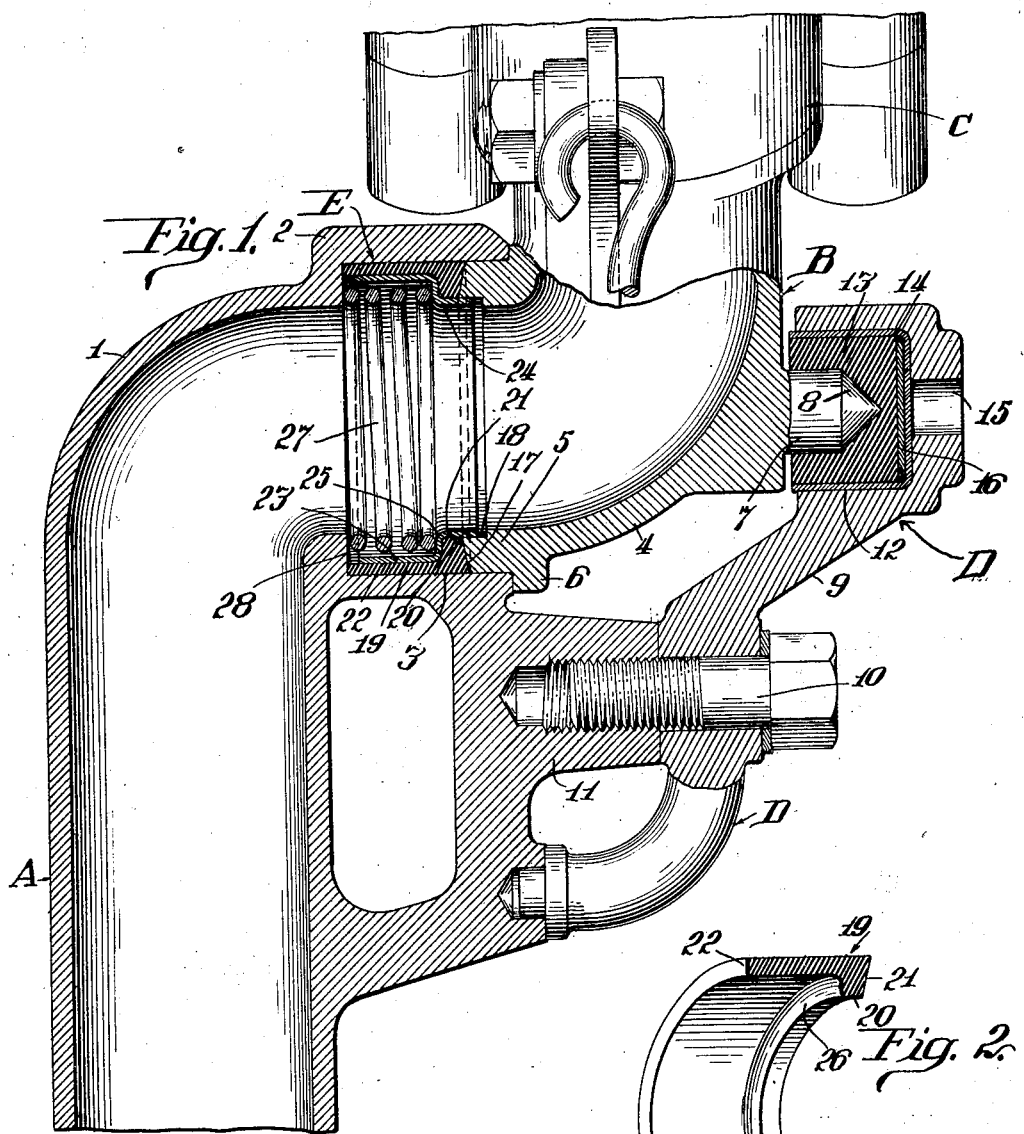

1,843,927

UNITED STATES PATENT OFFICE

THOMAS H. MANCHESTER AND EDWARD A. RUSSELL, OF CHICAGO, ILLINOIS, ASSIGNORS TO VAPOR CAR HEATING COMPANY, INC., OF CHICAGO, ILLINOIS, A CORPORATION OF NEW YORK

GASKET FOR FLEXIBLE PIPE JOINTS

Application filed April 5, 1930. Serial No. 441,922.

This invention relates to certain new and useful improvements in flexible conduit structures consisting of rigid metal elements flexibly articulated together, and more particularly to an improved form of gasket or sealing element for preventing the escape of steam or other fluid at the joint between the swiveled metallic members.

The flexible metallic conduit structure comprises a plurality of conduit or pipe sections, the meeting ends of each adjacent pair of sections being swivelled together, and since all of these swivelled joints are substantially similar, only one pair of sections and the interposed sealing means will be here shown and described. A nipple formed on the end of one conduit section extends into and is swiveled within the outer end portion of a socket formed in the end of the other conduit section. The improved gasket member is formed to simultaneously engage the end of the nipple and the outer wall of the socket between the nipple and the inner end of the socket. The gasket has an enlarged head or collar engaging the end of the nipple, and there is a metallic ferrule engaging the inner surfaces of the gasket and urged into operative position by a compression spring confined within the socket so as to force the gasket into sealing engagement with the two conduit members.

The principal object of the invention is to provide an improved sealing assembly for use in combination with a pair of telescoped conduit sections, such as briefly described hereinabove and disclosed more in detail in the specifications which follow.

Other objects and advantages of this invention will be more apparent from the following detailed description of one approved form of apparatus embodying the principles of the invention.

In the accompanying drawings:

Fig. 1 is a central vertical section through two articulated sections of the flexible metallic conduit structure, with the improved sealing means positioned therein.

Fig. 2 is a sectional perspective view of the improved gasket member.

Fig. 3 is a similar sectional perspective view of the ferrule.

The adjacent end portions of two of the metallic conduit or pipe sections of the flexible metallic conduit structure are indicated at A and B. It will be understood that the entire flexible conduit structure is composed of a series of these metallic pipe sections, provided with suitable elbow bends to give the desired form to the flexible conduit. This flexible conduit structure may be used in the steam or other lines connecting two adjacent cars of a railway train, and the upper section B may be supported from one of the cars by the mechanism indicated generally at C. A means indicated generally at D is provided for articulating the two sections A and B together, that is for preventing their separation by the pressure of the fluid confined therein, and E indicates generally the means for sealing the swiveled jaws between the sections to prevent the escape of steam or other fluid which is carried within the conduit. The present invention is concerned more particularly with the specific form of the sealing means E, the other parts here illustrated being of known construction.

The metallic conduit section A is formed at one end with an elbow bend 1, terminating in an enlarged head 2 in which is a cylindrical socket 3 of greater outer diameter than the bore of the conduit structure. The mating end of the conduit structure B is formed with an elbow bend 4 terminating in an annular nipple 5 adapted to fit snugly within the outer end portion of socket 3, and to swivel within this socket about the axis of the bore of the conduit structures. An outer annular flange 6 limits the projection of nipple 5 into the socket 3.

On the outer surface of the elbow 4 of conduit section B is formed an outwardly projecting stud or gudgeon 7 positioned concentric with the axis of the swiveled end portions of the conduit sections, and preferably provided with a conical end portion 8. A bracket 9, secured by bolt 10 or other equivalent fastening means to a bracket 11 formed on conduit section A, is formed with a cylindrical socket 12 positioned coaxial with the stud 7, and into which this bearing stud projects. A bushing or bearing block 13 of suitable anti-friction material is formed with a socket having cylindrical and conical portions in which the stud 7 is adapted to engage. The bearing block 13 is enclosed in a metallic thimble 14 adapted to seat within the cylindrical socket 12 in bracket 9. A passage 15 in the rear wall of bracket 9 permits the insertion of a tool to remove the thrust bearing assembly when desired, and a steel reinforcing plate or washer 16 is mounted in the bottom of thimble 14 and behind the bearing block 13. It will be apparent that the thrust bearing thus provided will prevent longitudinal separation of the telescoped conduit sections A and B, while at the same time permitting free relative rotation of these members about the central axis of the conduit.

The inner end portion of nipple 5 is tapered or beveled outwardly, as indicated at 17. The end of the bore of this annular nipple is also recessed, as indicated at 18, to receive the end of the metallic ferrule, hereinafter described. The improved gasket 19 is formed of suitable composition material and is provided with a head or collar 20 at one end of substantially the same inner diameter as the recessed end portion of nipple 5, and the end surface of collar 20 is beveled inwardly, as at 21, to fit against the outwardly beveled end portion 17 of the nipple. A thinner cylindrical portion 22 of the gasket extends from the collar 20 substantially to the opposite end of the socket 3, and bears against the outer wall of the socket. A metallic ferrule (see Fig. 3) comprises a larger cylindrical portion 23 of suitable size to fit within the thinner cylindrical portion 22 of the gasket, and a smaller cylindrical portion 24 of suitable size to fit within the head or collar 20 of the gasket, and of sufficient length to overlap the adjacent end of the nipple and extend into the recess 18. The inner diameter of the cylindrical portion 24 of the ferrule is preferably substantially the same as the inner diameter of the bore or conduit formed in the sections A and B. A radially extending shoulder 25 connects the two cylindrical portions 23 and 24 of the ferrule and is adapted to bear against the shoulder 26 formed at the inner side of collar 20 of the gasket. A compression spring 27 is confined between the shoulder 25 of the ferrule and the annular shoulder 28 formed at the inner end of socket 3.

It will now be apparent that the spring 27 will tend to expand and force the ferrule outwardly so as to force the collar 20 on the gasket into firm engagement with the end of the nipple. At the same time the engaging beveled faces of the gasket and ferrule will tend to force the gasket outwardly so as to form a firm engagement with the outer wall of socket 3 in the conduit member A. The larger cylindrical portion 23 tends to hold the thinner portion 22 of the gasket in firm sealing engagement with the outer walls of socket 3, the fluid pressure within the conduit members also serving to force the gasket member into firm engagement with both of the conduit sections. As the thrust bearing block 13 wears away, the conduit sections will tend to gradually separate, that is, the nipple 5 will move slightly out of the socket 3, but the spring 27 will cause the gasket member to follow up the nipple and maintain the sealing engagement. Although the portion 22 of the gasket will ordinarily extend the full length of the socket, it may in time move away from the inner end 28 of the socket, due to shrinkage of the gasket or the outward movement of nipple 5, but the sealing engagement will still be maintained against both the end of nipple 5 and the outer wall of socket 3 in the conduit section A. It will be apparent that this sealing assembly is easily inserted or replaced within the joint, and is quite simple and economical of manufacture and efficient in service.

We claim:

In a metallic conduit structure, a pair of conduit members, one of which is formed at the end with an annular nipple projecting into and swiveled within the outer end of an annular socket formed in the end portion of the other conduit member, the end portion of the nipple being beveled outwardly, there also being an annular recess formed in the inner surface of the end portion of the nipple to receive the end of a ferrule, a composition gasket comprising an annular end collar having an inwardly beveled end collar to engage the end of the nipple, the collar being of substantially the same inner diameter as the recessed end portion of the nipple, and a relatively thin annular portion extending from the collar substantially to the inner end of the socket and engaging the outer wall of the socket, a metallic ferrule having a larger cylindrical portion engaging within the thin portion of the gasket, a smaller cylindrical portion engaging within the gasket collar and within the recess in the nipple, and a radially extending shoulder connecting the two cylindrical portions and engaging behind the end collar of the gasket, and a compression spring confined between the shoulder of the ferrule and the inner end of the socket.

THOMAS H. MANCHESTER.
EDWARD A. RUSSELL.